No. 679,021. Patented July 23, 1901.
H. S. GOUGHNOUR.
DUST GUARD.
(Application filed Aug. 17, 1899.)

(No Model.)

WITNESSES:
S. E. Clarkson
B. M. Smith

INVENTOR
H. S. Goughnour
BY Geo. H. Parmelee
his ATTORNEY.

UNITED STATES PATENT OFFICE.

HENRY S. GOUGHNOUR, OF JOHNSTOWN, PENNSYLVANIA, ASSIGNOR TO THE LORAIN STEEL COMPANY, OF PENNSYLVANIA.

DUST-GUARD.

SPECIFICATION forming part of Letters Patent No. 679,021, dated July 23, 1901.

Application filed August 17, 1899. Serial No. 727,493. (No model.)

*To all whom it may concern:*

Be it known that I, HENRY S. GOUGHNOUR, of Johnstown, in the county of Cambria and State of Pennsylvania, have invented a new and useful Improvement in Dust-Guards, of which the following is a full, clear, and exact description, reference being had to the accompanying drawings, which form a part of this specification.

This invention relates to certain new and useful improvements in dust-guards for axle or journal boxes, and is designed to provide a device of this character which can be readily applied to an ordinary axle or journal box and which will automatically adjust itself to compensate for the wear of the packing, so as to maintain a practically dust-proof contact with the journal at all times.

My invention consists in a dust-guard composed of two separated guard plates or members surrounding the journal and having each on its inner face an axial projection formed with an annular concaved end, together with packing seated between such ends and springs tending to compress the said packing both longitudinally and radially by their action on said plates.

The invention further consists in the novel construction and combination of parts, all as hereinafter described, and pointed out in the appended claims.

Figure 1:
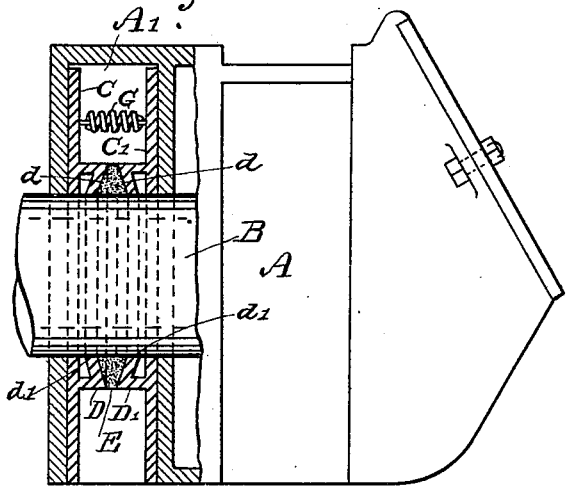
Figure 2:
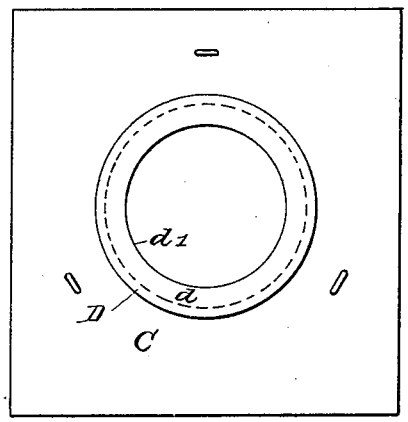
Figure 3:
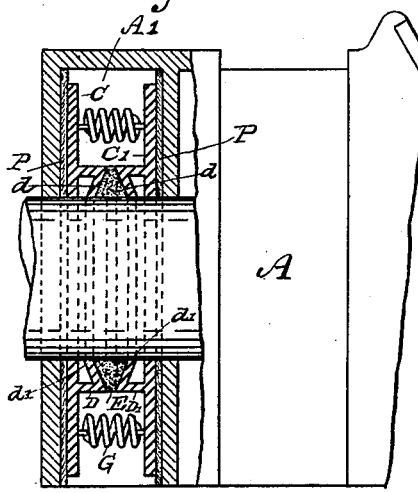
Figure 4:
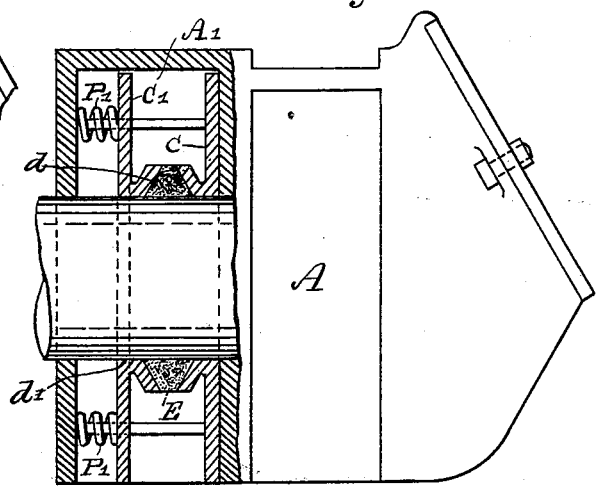
Figure 5:
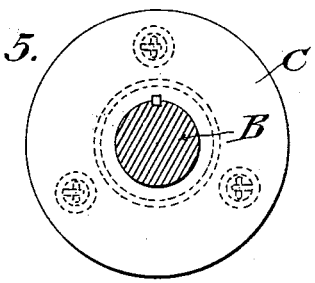

In the accompanying drawings, Figure 1 is a vertical section showing my invention applied to a car-axle box. Fig. 2 is a plan view of one of the guard members or plates. Fig. 3 is a view similar to Fig. 1, but showing a modified construction. Fig. 4 is a detail sectional view showing another modification. Fig. 5 is a detail view showing the manner in which one of the guard members of Fig. 3 is secured to the journal.

The letter A designates an ordinary car-axle box, and B a car-axle journal having the usual bearing in said box.

C C' designate the two guard members or plates, which are seated in the usual packing chamber or recess A' in the inner wall of the box, with central openings through which the journal B enters the box.

Each of the two guard members or plates C C' is formed on its inner face around its central opening $d'$ with an annular flange projection D or D'. The end faces of these projections are formed with the receding bevels, so that when the two plates are placed together on the journal there is formed by and between them an annular packing-space $d$, the cross-section of which at any point is substantially a triangle, with its base contiguous to the journal. This space is filled with packing E, of suitable fibrous and compressible character, as shown. It is held under a state of compression, both longitudinally and radially, by means of the springs G, which connect the two plates or members and tend to draw them together.

It will be readily seen that as fast as the packing wears away the action of the springs in bringing the guard plates or members toward each other will by reason of the converging or conical form of the walls of the packing-seats tend to compress said packing and force fresh portions of it into contact with the journal, and thus maintain an efficient guard, notwithstanding the wear, both against the entrance of dust and the escape of oil.

In the modification shown in Fig. 3 the guard plates or members are circular in form and are secured to the axle to rotate therewith instead of being held stationary, as in Fig. 1. Interposed between the plates or members and the walls of the space or chamber A' are washers P, of felt or other suitable material, which takes the wear of the rotating members. In this construction, wherein the entire guard revolves with the journal, there is no wear on the packing, which lasts for an indefinite period.

In the modification shown in Fig. 4, which only applies to constructions in which the guard-plates are stationary, instead of springs connecting said plates, I seat springs P' between the outer guard-plate C' and the outer wall of the chamber or recess A'. These springs not only serve to hold the packing E in a state of compression, but they also hold the inner plate C in contact with the inner wall of said chamber, and thus make a tight joint at this point.

I do not limit myself to the details which I have shown and described, as the construction may be changed in various particulars without departing from the spirit and scope of my invention.

Having thus described my invention, what I claim, and desire to protect by Letters Patent, is—

1. The herein-described dust-guard for axle or journal boxes, consisting of two guard plates or members surrounding the axle or journal and having each on its inner face an annular flange projection whose end face is formed with a receding bevel, whereby when said plates or members are placed together upon the journal there is formed by and between said projections an annular packing-seat the cross-section of which is substantially triangular with its broadest portion contiguous to the journal, packing material in the said space, and spring means acting upon said plates to compress said packing material both longitudinally and radially.

2. The combination with a journal or axle box having a recess or chamber in its end wall, of a dust-guard contained in said recess or chamber and consisting of a pair of plates rotatably secured to the journal and having at their inner sides projections forming between them around the journal an annular packing-space having its greatest width contiguous to the journal, springs tending to compress said packing, and washers interposed between the said plates and the walls of said recess or chamber.

3. The combination with a journal or axle box having a recess or chamber in its end wall, of a dust-guard contained in said recess or chamber and consisting of a pair of plates mounted on the journal to rotate therewith, each of said plates having on its inner face an annular flange projection whose end face is formed with a receding bevel, whereby when said plates are brought together upon the journal, there is formed between said faces an annular packing-seat of substantially triangular cross-section having its widest portion contiguous to the journal, together with springs tending to draw said plates together and thereby compress said packing both longitudinally and radially.

In testimony whereof I have affixed my signature in presence of two witnesses.

HENRY S. GOUGHNOUR.

Witnesses:
B. M. SMITH,
H. W. SMITH.